United States Patent [19]

Roth

[11] 4,065,287

[45] Dec. 27, 1977

[54] METHANOL TREATED ACTIVATED SLUDGE AS AN AGRICULTURAL CHEMICAL CARRIER

[75] Inventor: William B. Roth, Peoria, Ill.

[73] Assignee: The United States of America as represented by the Secretary of Agriculture, Washington, D.C.

[21] Appl. No.: 697,174

[22] Filed: June 17, 1976

[51] Int. Cl.² ................ C05F 3/00
[52] U.S. Cl. ................ 71/13; 71/21; 71/28; 71/33; 71/64 C; 71/77; 71/79; 71/DIG. 1
[58] Field of Search ............... 71/11, 12, 13, 27, 64 C, 71/1, 65, 79, DIG. 1, 3, 28, 33, 77; 210/15, 18

[56] References Cited

U.S. PATENT DOCUMENTS

| | | | |
|---|---|---|---|
| 3,226,318 | 12/1965 | Schick | 210/10 |
| 3,519,413 | 7/1970 | Trimbach et al. | 71/64 C |
| 3,562,176 | 2/1971 | Stancioff et al. | 71/64 C |
| 3,717,452 | 2/1973 | Gibsen et al. | 71/117 |
| 3,813,236 | 5/1974 | Allan | 71/94 |
| 3,950,159 | 4/1976 | Fox et al. | 71/11 |

*Primary Examiner*—Charles N. Hart
*Assistant Examiner*—Ferris H. Lander
*Attorney, Agent, or Firm*—M. Howard Silverstein; David G. McConnell; Curtis P. Ribando

[57] ABSTRACT

A novel means for the sustained release of agricultural chemicals is provided by a methanol treated activated sludge carrier. The viscous polymeric carrier has application in forming sprayable films, granular pellets, and seed coatings which are resistant to natural mechanisms of chemical loss.

17 Claims, No Drawings

METHANOL TREATED ACTIVATED SLUDGE AS AN AGRICULTURAL CHEMICAL CARRIER

BACKGROUND OF THE INVENTION

The field of this invention relates to the controlled release of agricultural chemicals to their target organisms. Materials of particular interest are pesticides and fertilizers which are normally applied directly to the soil, to the plant foliage, or to an inert carrier.

Upon application, many biologically active materials, such as pesticides, rapidly lose their effectiveness. They are subject to run-off, spray-drift, volatilization, leaching, sorption by organic matter, and chemical, photochemical, and microbiological degradation. To compensate for the loss of pesticide activity, applicators tend to apply dosage rates in excess of the prescribed concentration. This creates an added expense and also an environmental hazard, particularly to nontarget animal and plant life.

Attempts have been made to produce sustained release compositions by physically mixing pesticides with various carrier substances, such as kaolin clay. Other compositions have employed wetting agents, surfactants, fillers, and colloids to provide a coating to enhance sticking to the surfaces of the active sites. These compositions have not been satisfactory in that the additives frequently alter the toxicity of the active ingredient, and are not always stable under adverse weather conditions.

Other pesticide systems have used synthetic polymers as encapsulating agents or carriers, such as described in U.S. Pat. Nos. 3,851,053 and 3,660,563. However, these polymers have not shown clear metabolic rates in soil and are under attack by the Environmental Protection Agency and the Food and Drug Administration. Moreover, encapsulating materials for pesticides must be formulated to permit constant rate diffusion through surface pores therein. Fabrication of such devices is difficult and expensive.

Another problem exists in putting the active ingredients in sprayable form at the desired concentration. As pointed out in U.S. Pat. No. 2,390,941, most herbicides, for example, are insoluble in water. The patent further mentions that prior attempts to dissolve the insoluble compounds in suitable organic solvents and to subsequently dilute them with water have resulted in precipitation of the compounds.

U.S. Pat. No. 3,813,236 discloses a method of chemically combining organic pesticides with a natural polymeric substrate such as lignin or a lignin-containing material. The product is an insoluble composition which suffers from the limitation of not being in a conveniently sprayable form as discussed above.

A sprayable pesticide composition which overcomes some of the problems in the prior art is taught in U.S. Pat. No. 3,717,452. The procedure disclosed therein involves incorporating a small amount of Xanthomonas hydrophilic colloid in the aqueous carriers for the agricultural chemicals. The viscosity of the mixture imparted by the colloid retards spray-drift, run-off, and evaporation. However, the water solubility of the colloid mixture renders it susceptible to washing by rain, thereby limiting the effectiveness of the active ingredient. Moreover, the economic attractiveness is diminished by the expense of producing and recovering the Xanthomonas colloid.

SUMMARY OF THE INVENTION

The instant invention overcomes the disadvantages of the prior art relating to the application of agricultural chemicals, particularly pesticides, fertilizers, and insect attractants and repellants. It provides a low-cost carrier additive derived from sewage sludge which improves the effectiveness of the active ingredients. Moreover, it renders versatility to the mode of application by its adaptability to form sprayable film concentrates, cast and rolled film sheets, granular pellets, and seed coatings.

It is an object of the present invention to produce a composition which provides for controlled release of agricultural chemicals, permitting reduced dosage rates with less contamination of the environment and nontarget organisms.

It is another object of the instant invention to reduce losses of agricultural chemicals by run-off, spray-drift, volatilization, leaching, sorption, and chemical, photochemical, and microbiological degradation.

It is also an object of the invention to produce a composition having diverse modes of application, including films, sheets, coatings, and impregnants.

It is an object of the invention to employ a carrier substance which is readily available, inexpensive, biodegradable, and has inherent fertilizing value.

It is another object of the invention to find a use for the abundant surplus of sludge emanating from treatment of sewage.

It is a further object of the invention to employ a carrier which may be crosslinked with activated dialdehyde starch to produce a continuous film, or may be strengthened with polyvinyl alcohol to produce a self-supporting sheet.

It is also an object of the invention to provide a carrier substance which is compatible with all agricultural chemicals in forming stable spray solutions or suspensions, and which will not alter the effect of the active ingredient.

It is finally an object of the invention to provide a carrier substance which is stable under adverse weather conditions and, although hydrating in water, does not redissolve and is not washed off the substrate by rain.

DESCRIPTION OF THE PREFERRED EMBODIMENT

The instant invention has application for all types of agricultural chemicals. The chemicals may be liquid or solid and soluble in either water or an organic solvent. Of particular interest are pesticides, fertilizers, plant growth regulators, attractants and repellants.

"Pesticide" is defined herein in its broadest sense. Webster's Third New International Dictionary, Copyright 1961, defines "pest" as "an epidemic disease," or "anything resembling a pest in destructiveness, noxiousness, etc." Accordingly, a "pesticide" is an agent (as a chemical) used to destroy a pest or to kill bacteria, fungi, and other forms of undesirable plant or animal life. Examples of pesticides are herbicides, insecticides, fungicides, miticides, bactericides, and nematocides. Some of the chemical classes of these for which the invention is anticipated, but without limitation thereto, are: aliphatic acids (AL), amides and anilides (AM), aromatic acids and esters (AR), carbamates and thiocarbamates (CB), cationics (CT), diazines (DZ), nitroanilines (NA), nitriles (NT), phenols and dicarboxylic acids (PH), phenoxy compounds (PO), triazines and triazoles (TZ), ureas (UR), miscellaneous nitrogenous compounds (N), cyclic oxygen compounds (O), organochlorines (OCL), organophosphorus compounds (OP), and aromatic and cyclic sulfur compounds (S).

"Fertilizer" is also used in its broadest dictionary sense to mean "that which renders fertile; esp. any artificial manure or commercial fertilizer." Inclusive, without limitation thereto, are: the nitrogen compounds, such as ammonia, ammonium salts, urea, sodium nitrate, calcium cyanamide, etc.; the phosphorus compounds, such as phosphoric acid, the phosphates and superphosphates; the potassium compounds such as potassium chloride and potassium sulfate; and the trace minerals, such as iron, zinc, cobalt, copper, etc. Likewise, "plant growth regulator" refers to any of the known chemical compounds which regulates the growth of plants. "Attractants" and "repellants" are defined herein to be inclusive of all those chemical compounds which possess these designated functions. Of particular interest are the insect sex attractants, or pheromones, commonly known in the trade as cue-lure, methyl eugenol, trimedlure, and grandlure.

The objects of the invention are achieved by virtue of incorporating the active ingredient in a carrier substance hereafter referred to as methanol treated activated sludge, or MAS. The details of preparing MAS have been reported by E. N. Davis and L. L. Wallen in a paper entitled "Viscous Product from Activated Sludge by Methanol Fermentation," presented for publication in Applied and Environmental Microbiology (AEM), Vol. 32, No. 2, August 1976, pp. 303–305.

The source material for preparing MAS is any fraction from an activated sludge process that contains viable microorganisms from the activated sludge. Preferably, the source material is the recovered activated sludge itself. Although, recirculated activated sludge diluted with primary effluent may also be used. Activated sludge is the product of aerobic agitation of sewage which has been oxidized and flocculated by bacterial action (cf. L. N. Hughes and J. T. Meister, Journal WPCF, 44(8): 1581–1600, August 1972). It is in ample supply from municipal sewage treatment plants and constitutes an inexpensive, environmentally recycled additive for use in the instant invention.

The MAS may be prepared by fermenting any sludge source material as defined above in the presence of methanol under any suitable conditions or at any concentrations which are effective to yield a viscous polymeric product having a viscosity ranging from about 2,000 to about 14,000 cps. The solids content of the viscous product should be in the range of 0.1–2.5%. Example 1 below illustrates an effective procedure, but is in no way limiting of the parameters or conditions of reaction which may be employed.

It was unexpectedly discovered that MAS provided excellent carrier and controlled release properties when combined with agricultural chemicals. It is compatible with all agricultural materials except those which are decomposed by water. With stirring or shaking under ambient conditions, it readily combines with solids, liquids, wettable powders, emulsifiable concentrates, aqueous solutions, and chemicals dissolved in organic solvents.

The viscous nature of the MAS carrier imparts versatility to its mode of application. In one embodiment, the MAS is admixed with the desired amount of pesticide and diluted with water to a sprayable solution. It can then be applied with conventional spraying equipment either to the surface of the soil or incorporated in the soil, to target plant foliage, or to an inert substrate such as paper or cardboard. The material readily adheres to the surface, thereby forming a thin continuous film or coating. When dry, the film is somewhat absorbent to moisture. However, it remains substantially insoluble in water and thereby resistant to prolonged adverse weather conditions. The dispersed chemicals are bound to the carrier and are protected from losses by rapid volatilization, leaching, and degradation by chemical, photochemical, and microbiological means. While not desiring to be bound to any particular theory, the mechanism of release of the pesticide's active ingredient (AI) to the target substrate or organism is thought to be a function of leaching from the carrier as influenced by climatic conditions and/or biodegradation of the MAS polymer.

In an alternate embodiment, the mixture of MAS and agricultural chemical is cast onto a smooth surface such as glass or metal, spread to the desired thickness with a doctor blade, then dried and recovered as a coherent film. As further discussed below, polyvinyl alcohol and dialdehyde starch may also be added to the MAS and agricultural chemical. This resultant mixture yields a viscous gel which can be kneaded or rolled out in sheet form on a rubber mill and subsequently dried as a smooth and continuous film. When applied to the target area, the ready-made film produced by either procedure functions in the same manner as the sprayed coating discussed above.

In another embodiment, granules or pellets may be prepared. One procedure is to dip or spray coat commercial granular products with the MAS of the instant invention. Alternatively, an extrudable matrix may be formed by dispersing the agricultural chemical in the carrier at a relatively high solids concentration. The solids of the initially wet material are easily adjusted by dehydration or the addition of an absorbent solid. Dried digested sludge is a particularly suitable solid due to its availability, relatively high absorbency, and its inherent fertilizing value. The matrix may be pelleted in a conventional extrusion apparatus. It is preferred that the extrusion conditions be maintained below the point of decomposition of the chemicals as would be within the skill of a person in the art.

In still another embodiment, crop seeds are coated with the MAS carrier having one or more agricultural chemicals dispersed therein. The process of coating may be by dipping, soaking, spraying, or other conventional mode of application. When employing herbicides, it is preferred to minimize contact time of the seeds with the wet carrier mixture in order to inhibit excessive absorption through the seed coat, which could adversely affect germination of the seed. In practice, the coated seeds are planted as usual and release the active component to the surrounding soil. An unexpected advantage of this embodiment is that the coating is not removed through the action of mechanical sowers, particularly the air-planters, as with prior art pesticide seed coatings that are dusted on the seeds. All known crop seeds, including for example, corn, sorghum, and soy, would be receptive to the instant coating process.

In any of the above embodiments, the film-forming properties of the novel composition may be improved by the addition of a crosslinking agent such as activated dialdehyde starch (DAS). While not being bound by any particular theory, it is believed that the aldehyde groups of the DAS crosslink nitrogen groups in the composition to enhance the formation of a continuous film. Available nitrogen groups may be present in the MAS polymer. Moreover, it has been observed that the crosslinking phenomenon is particularly effective when the active component of the composition contains an amino or other nitrogen group, such as in the diazines, triazines, and nitriles. Operable amounts of DAS range from 0.006 to 2.5% (solids) by weight of the final wet mixture with a preferred range of 0.1 to 2.0% by weight. In practice, a 13.3% solution of DAS is frequently employed. In this case, the operable amount of solution added would range from 0.4 to 22.0% by weight of the final composition, with a preferred range of 0.5 to 15.0% by weight.

The amount of MAS addition is a function of the intended use of the final wet mixture. A higher viscosity is normally desirable in a seed coating than in a spray solution. The lower limit of MAS concentration necessary for the product to form a continuous film is about 0.006% (solids) by weight of the final wet mixture. The upper limit is generally about 2.5% (solids) by weight of the final wet mixture. The preferred amount of MAS ranges from 0.1 to 2.0% by weight.

When DAS is incorporated into the product, it is desirable to maintain a DAS:MAS solids ratio from 1:5 to 0.4:1, with a preferred ratio of about 1:1.

The agricultural chemical and the solvent usually constitute the remainder of the composition. The agricultural chemical may be technical grade or may contain additives such as those commercially employed in the preparation of wettable powders and emulsifiable concentrates. Commercial pesticides are frequently dissolved in organic vehicles such as kerosene or xylene. The concentration of the chemical in the final composition would be dependent upon its intended use as determined by the skilled artisan. Normally, it would range from about 0.001% to about 50%. Generally, water is the primary solvent, although organic solvents or mixtures of organic solvents and water are compatible in this composition. The mixture includes the water added with the MAS and DAS solids, diluent water, and the vehicle, if any, for the agricultural chemical. The total amount is variable, and may be adjusted according to the desired consistency and mode of utilization of the final wet mixture. For example, the quantity of solvent in an extrudable matrix would be substantially less than that in a sprayable solution.

The film or coating may be strengthened by the inclusion of polyvinyl alcohol (PVA) or water-soluble starch derivatives, such as starch acetate, hydroxypropyl amylomaize starch, or cyanoethylated corn starch. The proportions may range from 5.0 to 50% by weight of the final wet mixture, and preferably from 10 to 20% by weight. These materials can be solubilized in hot water, then cooled to room temperature for addition to the composition.

Other substances such as antifoam agents, colorants, fillers, and pelleting aids may also be added. Digested sludge is a lowcost and readily available filler substance, particularly useful in the pelleting embodiment. Sodium stearate is an example of an effective pelleting lubricant.

The novel agricultural compositions of all the above embodiments may conveniently be prepared in a conventional mixing apparatus at ambient conditions. However, other temperatures and pressures which do not degrade the active ingredients may also be employed.

The invention is more clearly illustrated by the following examples. The abbreviations which appear therein are defined as follows:

| | |
|---|---|
| PVA | polyvinyl alcohol |
| MAS | methanol treated activated sludge |
| DAS | activated[1] dialdehyde starch solution (13.3%) |
| w.b. | wet basis |
| d.b. | dry basis |
| w/v | weight per unit volume |
| cps. | centipoises |
| g. | gram(s) |
| mg. | milligram(s) |
| ml. | milliliter(s) |
| AI | active ingredient |

[1]The activated dialdehyde starch (DAS) used for the examples was prepared from corn starch. The extent of oxidation of the starch by periodic acid was 95% of theory. In the preparation, 10 parts DAS were added to 80 parts distilled water and stirred continuously while heating for 10 min. at 95° C. (203° F.). The slurry was cooled to 85° C. (185° F.) and 1 part borax was added. This premix was stirred briefly while cooling to 75° C. (167° F.) to form a straw-colored activated DAS solution. The solution was cooled rapidly in a cold-water bath to 25° C. (77°F.) and the final volume adjusted to 75 ml. with distilled water. The concentration of DAS in the solution was 13.3%.

The capitalized designation enclosed in parentheses after each pesticide name refers to the chemical class as defined above to which it belongs. The small letter in the parentheses after the chemical class designation refers to the normal state of the pesticide at ambient conditions: "l" for liquid; "s" for solid.

All chemical names of pesticide and insect attractants appearing in the examples are the common names accepted for usage by the Agricultural Research Service and the American National Standards Institute.

The antifoam agent used in the examples is a typical antifoam preparation manufactured by the Hodag Corporation and sold under the trade name "TBX".

EXAMPLE 1

Following the procedure of Davis and Wallen, supra: activated sludge was obtained from the Greater Peoria Sanitary District Waste Disposal Plant. Samples were taken from the input end of reaeration bay No. 1, that receives settled activated sludge from two secondary treatment bays aerated by diffusers and turbines (Hughes et al., supra). 500-ml. aliquants were transferred to Fernbach flashs on a rotary shaker (New Brunswick G-53) at 200 r.p.m. and 25° C. within an hour after collection. Methanol (ACS certified grade) was added at 2% by volume initially and an additional 2% by volume added after 48 hr. (2 da.) on the shaker. Flasks were removed from the shaker after 120 hr. fermentation (5 da.) and a viscous, black, polymeric pudding was recovered for utility in this patent application. Viscosity (average of 10 readings) ranged from 2,000 to 14,000 cps. as measured on a Brookfield Viscometer (Model RVT, No. 4 spindle, 30 r.p.m., and 25° C.). Utility of MAS can be extended from 1 to 3 mo. by refrigeration, although some apparent breakdown of polymer does occur. However, lyophilization of the viscous polymer after 5 da. fermentation in methanol provided a ready source of renewable material. A viscous polymer was regenerated by dispersing 2 parts of the lyophilized sample in 98 parts distilled water and left standing 30 min. at 25° C.

Examples 2–19 illustrate the film-forming abilities of the MAS carrier upon casting, when incorporated with a variety of agricultural chemicals.

EXAMPLE 2

A 20.0-g. (w.b.) sample of MAS was slurried with 4.0 ml. of distilled water and after thorough mixing, cast on a glass plate using a 6 inch × 0.030 inch doctor blade and air dried at room temperature to produce a brittle, translucent film.

EXAMPLE 3

A 10.0-g. (w.b.) sample of MAS was mixed with 1 drop antifoam agent and a 2.0-ml. aliquot of DAS and then cast on a glass plate with a 6 inch × 0.030 inch doctor blade and air dried at room temperature to form a brittle, translucent film.

EXAMPLE 4

A 20.0-g. (w.b.) sample of MAS was mixed with a 10-ml. aliquot of 2,4-D (PO, s) solution (0.5 g./ml. acetone) and cast on a glass plate using a 3 inch × 0.050 inch doctor blade and air dried at room temperature. This sample produced an intact film weighing 0.75 g. and containing 27.9% 2,4-D as active ingredient.

EXAMPLE 5

A 20.0-g. (w.b.) sample of MAS (1.2% solids, d.b.) was mixed with a 2-ml. aliquot (0.10 g./ml. acetone) chloramben (AR, s) and to this mix was added 0.8-ml. aliquot of activated DAS with vigorous stirring and cast onto a glass plate using a 6 inch × 0.030 inch stainless steel doctor blade. This formulation was air dried at room temperature to produce a tissue-thin, continuous film. In accordance with this same procedure, films were also obtained with butylate (CB, l), chlorpropham (CB, s), 2,4-D (PO, s), dichlobenil (NT, s), EPTC (CB, l), methyl eugenol (l), and trifluralin (NA, s).

EXAMPLE 6

Example 5 was repeated using butylate as the active ingredient in the following amounts: 0 g. (control); 0.1 g.; 0.2 g.; and 0.3 g. Butylate is one of the more volatile herbicides on the market today. When used in the film of the instant invention, its volatility losses upon standing are minimal as determined by nitrogen analyses (Kjeldahl method) of the samples. The results are shown in Table I.

Table I

| Sample | % N (0 wk.) | % N (1 wk.) | % N (3 wk.) |
|---|---|---|---|
| 1. 0 g. (Control) | 1.95 | 2.20 | 2.06 |
| 2. 0.1 g. (20.96%) | 2.30 | 2.31 | 2.36 |
| 3. 0.2 g. (34.42%) | 2.68 | 2.68 | 2.78 |
| 4. 0.3 g. (43.81%) | 2.96 | 3.08 | 2.94 |

EXAMPLE 7

A 20.0-g. (w.b.) sample of MAS was mixed with 0.5 ml. methyl parathion (OP, l) (80% solution in xylene) and 0.8 ml. DAS with thorough mixing, cast on a glass plate using a 3 inch × 0.050 inch doctor blade, and air dried at room temperature to form a continuous but brittle film.

EXAMPLE 8

1.0 g. PVA was dispersed in 4.0 g. hot distilled water with stirring, then cooled to room temperature (25° C.) and mixed with 10.0 g. (w.b.) MAS (2.3% solids, d.b.), one drop of antifoam agent, 1.0 g. metham (CB, l), and 2.0-ml. aliquot DAS with continuous stirring to rapidly form a thick gel. This viscous gel was wrapped in "Saran" (vinyl chloride-vinylidene chloride copolymer) and rolled out flat like pie dough and dried at room temperature to form a flat film.

EXAMPLE 9

A 0.60-g. sample of PVA was dispersed in 4.40 g. distilled water at 25° C. and left standing for 30 min., then heated on a steam bath to solubilize the PVA, and cooled to room temperature; to this solution two drops of antifoam agent and 20.0 g. MAS were added with stirring. A 2.0-ml. aliquot of active ingredient (0.50 g./10 ml. acetone) and 0.8-ml. aliquot of DAS was then added with vigorous stirring. The mixture was cast onto a glass plate using a 6 inch × 0.030 inch stainless steel doctor blade and air dried to give a continuous film.

The active ingredients tested were (1) herbicides: trifluralin (NA, s), butylate (CB, l), fenac (AR, s), butralin (NA, s); (2) insecticides: malathion (OP, l), naled (OP, l); (3) lures: methyl eugenol (l), cue-lure (l), trimedlure (l).

EXAMPLE 10

The procedure of Example 9 was repeated except for using 0.50 g. PVA in 4.50 g. distilled water and 0.20 g. of each of the following ingredients: chloramben (AR, s), chlorpropham (CB, s), 2,4-D (PO, s), dalapon (AL, l), dichlobenil (NT, s), diquat (CT, l), silvex sodium salt (PO, s), trifluralin (NA, s), naptalam (AR, s), metham (CB, s), chlordimeform (N, s), diazinon (OP, s), carbofuran (CB, s), and fonofos (OP, l). Each sample produced a continuous film when cast onto a glass plate.

EXAMPLE 11

The procedure of Example 9 was repeated with a 2.0-ml. aliquot of the attractant cue-lure and a 2.0-ml. aliquot of the insecticide naled (OP, l) together as the active ingredients.

EXAMPLE 12

The procedure of Example 11 was repeated substituting methyl eugenol for the attachment. A continuous film was formed.

EXAMPLE 13

The procedure of Example 11 was repeated substituting trimedlure as the attachment and malathion as the insecticide. A continuous film was formed.

EXAMPLE 14

0.5 g. of PVA was added to 4.5 g. of distilled water and left standing 30 min., then heated on a steam bath to solubilize the PVA. After cooling to room temperature, 0.32 g. atrazine (TZ, s) was added with continuous mixing, followed by the addition of 20.0 g. MAS (1.8% solids, d.b.) plus two drops antifoam agent and a 0.4-ml. aliquot of DAS. Upon completion mixing, the slurry was cast with a 6 inch × 0.030 inch doctor blade on a glass plate. A continuous film was obtained upon drying at room temperature.

EXAMPLE 15

The procedure of Example 14 was repeated substituting a 1.0-ml. aliquot of bentazon (DZ, l) (0.45 g./ml.) for the atrazine. A continuous film was obtained.

EXAMPLE 16

The procedure of Example 14 was repeated substituting a 1.0-ml. aliquot of alachlor (AM, s) (1.0 g./10 ml. acetone) for the atrazine and omitting the DAS.

EXAMPLE 17

The procedure of Example 14 was repeated substituting a 1.0-ml. aliquot of triallate (CB, l) (1.0 g./10 ml. acetone) for the atrazine.

EXAMPLE 18

0.5 g. of PVA was slurried in 4.5 g. distilled water and left standing 30 min., then heated on a steam bath to solubilize the PVA. After cooling to room temperature, one drop antifoam agent was added followed by 20.0 g. MAS, 1.0-ml. aliquot of 48.0% glyphosate (AL, l), and a 0.8-ml. aliquot of activated DAS while mixing thoroughly. The mixture was cast on a glass plate using a 6 inch × 0.030 inch doctor blade to form a continuous film.

EXAMPLE 19

The procedure of Example 18 was repeated using a 1.0-ml. aliquot of 36.0% glyphosate to produce a continuous film.

EXAMPLE 20

The herbicidal effect of a butylate-containing film on grass seed germination was tested. A 5.0-g. (w.b.) sample of MAS was mixed with a 2.0-ml. aliquot of butylate (AR, l) (0.01 g./ml. acetone). To this slurry was added a 0.2-ml. aliquot of DAS and 6.0 ml. distilled water to reduce the viscosity of the mixture which was stirred vigorously for several minutes. The herbicidal activity of the MAS-butylate was tested in comparison with 96.4% technical grade butylate in the following seed germination test.

A. A 0.5-ml. aliquot of 96.4% technical grade butylate (5 mg./0.5 ml. acetone) was pipetted into a vitreous clay pot containing 40.0 g. potting soil plus 5.0 g. distilled water.

B. 3.05 g. of MAS-butylate coating mixture (0.15% AI) as prepared above was pipetted into a vitreous clay pot containing 40.0 g. potting soil plus 5.0 g. distilled water.

Periodic addition of water was fed at the base of each pot to avoid washing herbicide out of the soil. Twenty grass seeds were planted in each pot at the specified time intervals after treatment. The results appear in Table II below:

Table II

| | Time interval between treatment and planting | Germination over 35-da. period |
|---|---|---|
| A. Butylate 5.0 mg. (4.8 mg. AI) | 2 hr. | 0 |

Table II-continued

| | Time interval between treatment and planting | Germination over 35-da. period |
|---|---|---|
| | 3 da. | 0 |
| | 5 da. | 0 |
| B. MAS-butylate coating 3.05 g. (4.6 mg. AI) | 2 hr. | 0 |
| | 3 da. | 0 |
| | 5 da. | 0 |

The results set forth in Table II indicate that the effectiveness of the butylate is not diminished by the presence of the MAS carrier.

EXAMPLE 21

Several film specimens were tested for herbicidal activity in germination studies with grass seed. The following films were prepared according to the procedure of Example 9. See Table IIIa.

For each test, 100.0 g. of potting soil was placed in a 12-oz. styrofoam cup and implanted with 20 grass seeds on the upper surface of the soil (top ¼ inch). A sample of film 2¾ inch diameter) was placed on top of the soil containing the seeds, and the film was moistened with approximately 3.0 g. distilled water. The results appear below in Table IIIb.

EXAMPLE 22

The stability of the dried film to solvents was tested. A sample of film containing trifluralin (16.5% AI) and weighing 0.17583 g. was soaked in 15 ml. distilled water for 1 hr. A Table IIIa

| | Films | | | | |
|---|---|---|---|---|---|
| | B | C | D | E | F |
| PVA | 0.60 g. | 0.50 g. | 0.75 g | 0.60 g. | — |
| Water | 3.40 g | 4.50 g. | 4.25 g. | 4.40 g. | — |
| MAS[1] (w.b.) | 4.0 g. | 10.0 g. | 20.0 g. | 20.0 g. | 20.0 g. |
| Herbicide | 0.10 g./2 ml. acetone | 0.10 g./2 ml. acetone | 0.20 g./4 ml. ethanol | 0.20 g./4 ml. acetone | 0.10 g./2 ml. acetone |
| DAS solution[2] | 0.2 ml. | 0.4 ml. | 0.8 ml. | 0.8 ml. | 0.8 ml. |

[1]1.23% solids.
[2]13.3% w/v.

Table IIIb

| Test | Treatment[1] | Results |
|---|---|---|
| A | Control—no film | All germinated 3-5 da. and survived |
| B | Film, 7.8% trifluralin | No sprouts after 14 da. |
| C | Film, 11.4% trifluralin | No sprouts after 5 da. |
| D | Film, 13.2% chloramben | 14 sprouts in 5 da., all died within 4 wk. |
| E | Film, 17.4% 2,4-D | All sprouts germinated beneath film |
| F | 0.71 g. shredded film, 15.2% chlorpropham | 2 sprouts in 13 da. |

Specified percentages represent maximum amounts.

25-ml. volume of chloroform was then added, and the mixture was shaken vigorously. The solvent layer was recovered, and the film was washed twice more with fresh volumes of chloroform. The solvent was then evaporated to dryness. Trifluralin recovery = 0.005 g.; film recovery = 0.144 g. Since the removal of herbicide was very low, the film from the above test was soaked in a volume of acetone which was decanted via filtration. This step was repeated several times and the residual solvent was removed by evaporation. Trifluralin recovery = 0.02127 g.; film recovery = 0.13585 g.

Examples 23-26 illustrate the film-forming abilities of the MAS carrier upon spraying.

EXAMPLE 23

A 5.67-g. (w.b.) sample of MAS (2.0% solids, d.b.) was mixed with 2.84 g. (50% wettable powder) phosmet (AM, s) insecticide and a 0.8-ml. aliquot of DAS to form a pastelike concentrate containing 16.4% AI as phosmet, 1.27% as MAS, and 1.27% as DAS.

The following dilutions were made from this concentrate:
   A. A 2.0-g. sample of concentrate was diluted to 20.0 g. with distilled water to give 1.64% (AI) as insecticide concentration.
   B. A 5.0-g. sample of (A) was diluted to 17.5 g. with distilled water to give 0.47% (AI) as insecticide concentration.
   C. A 5.0-g. sample of (B) was diluted to 30.0 g. with distilled water to give 0.08% (AI) as insecticide concentration.

Samples (A), (B), and (C) were sprayed on glass plates using a dupli-color spray gun at 30 p.s.i.g. to observe the filming action of the dried coatings. Continuous films were observed in all three samples.

EXAMPLE 24

The procedure of Example 23 was repeated without the DAS addition to form a pastelike concentrate containing 18.1% (AI) and 1.4% MAS. Dilutions were made as before to give: (A) 1.81% (AI); (B) 0.52% (AI); (C) 0.087% (AI) insecticide concentrations. Samples (A), (B), and (C) were sprayed on glass plates and the following information was noted after drying: (A) and (B) formed continuous films, (C) formed a thin powdery film.

EXAMPLE 25

The procedure of Example 23 was repeated except 1.50 g. phosmet (95.4% technical grade) was substituted for the wettable powder to form a pastelike concentrate.

The following dilutions were made:
   A. A 2.0-g. sample of concentrate was diluted to 24.0 g. with distilled water to give 1.64% (AI) as insecticide concentration.
   B. A 5.0-g. sample of (A) was diluted to 17.5 g. with distilled water to give 0.47% (AI) as insecticide concentration.
   C. A 5.0-g. sample of (B) was diluted to 30.0 g. with distilled water to give 0.078% (AI) as insecticide concentration.

Samples (A), (B) and (C) were sprayed as before to give the following results: (A) formed a continuous film; (B) formed a continuous film; (C) formed spots but appeared too dilute to form a continuous film.

EXAMPLE 26

The spraying characteristics of insecticides in distilled water without the carrier substance of the instant invention were tested. 1.0% concentrations of insecticide (AI) were prepared for $(A_p)$ phosmet (50% wettable powder) and $(B_p)$ 95.4% technical grade phosmet.

Sample (A) formed a film product on drying at room temperature on a glass plate. Sample (B) did not form a film after drying on a glass plate.

EXAMPLE 27

Resistance of the sprayable dried film to rehydration and run-off was tested.

Glass plates containing the dried film from Examples 23, 24, and 25 were tested for run-off with water droplets by positioning the plates at a 45° angle and allowing 1-3 drops of distilled water to wet the film. No run-off or streaking of the dried material was observed, and upon redrying, the film spot on the glass plate recovered its initial appearance.

EXAMPLE 28

Resistance of the spray solution to settling was tested. The settling rates of the insecticide from solution for Examples 20 (A), 21 (A), 23 ($A_p$), and 23 ($B_p$) were compared based on visual examination. The results are set forth in Table IV.

Table IV

| Example | 1 hr. | 24 hr. | 7 da. |
|---|---|---|---|
| 23 (A) (1.6% AI) | 0% | 10% | 50% |
| 24 (A) (1.8% AI) | 0% | 10% | 50% |
| 26 ($A_p$) (1%AI) | 100% | 100% | 100% |
| 26 ($B_p$) (1% AI) | 100% | 100% | 100% |

The MAS in the spraying compositions was compatible with pesticides and showed no evidence of plugging the spraying equipment. This polymeric material provided a dual function in forming a homogeneous mixture and a continuous film with adhesive qualities and resistance to rehydration upon wetting in water.

Examples 29–34 relate to dip coating seeds in the composition of the instant invention.

EXAMPLE 29

A 20.0-g. (w.b.) sample of MAS was vigorously mixed with 0.10 g. of sodium pentachlorophenate ("Dowicide-G"), a bactericide, a 0.8-ml. aliquot of DAS, and 20.0 g. distilled water. Soybean (Amsoy and Hawkeye varieties) and yellow corn (ED-96-1971 crop) seeds were dip coated in the slurry and air dried at room temperature. Four coated seeds and four uncoated seeds (control) of each variety were placed in covered petri dishes containing No. 54 Whatman paper and 6.0 ml. distilled water. The germination results are set forth in Table V below.

Table V

| | Germination observations | | | |
|---|---|---|---|---|
| Sample | 2 da. | 3 da. | 5 da. | 7 da. |
| Amsoy control | 3 sprouts | 3 sprouts | 4 sprouts | 4 sprouts |
| Amsoy coated | | 0 sprouts | 1 tip | 2 sprouts |
| Hawkeye control | | 2 sprouts | 2 sprouts | 3 sprouts |
| Hawkeye coated | | 1 tip | 1 tip | 1 tip |
| Corn control | | 2 sprouts | 3 sprouts | 3 leaf stage |
| Corn coated | | 2 sprouts | 3 sprouts | 3 leaf stage |

EXAMPLE 30

The coating of Example 29 was prepared with the further addition of a 1.0-ml. aliquot of carbofuran (CB, s) (1.0 g./10 ml. acetone), an insecticide. Sorghum seeds (IS 11167) and corn seeds (a-632) were dip coated in the slurries and air dried at room temperature. Four coated seeds and four uncoated seeds of each variety were tested for germination in petri dishes containing No. 54 Whatman paper and 2.0 g. distilled water. The results are set forth in Table VI below.

TABLE VI

| | Germination observations | |
|---|---|---|
| Sample | 3 da. | 9 da. |
| A. Sorghum control | 0 sprouts | 2 sprouts |
| B. Sorghum coated | 0 sprouts | 0 sprouts |

TABLE VI-continued

| Sample | Germination observations | |
|---|---|---|
| | 3 da. | 9 da. |
| C. Corn control | 4 sprouts | 4 sprouts |
| D. Corn coated | 1 sprout | 3 sprouts |

EXAMPLE 31

A 5.0-g. (w.b.) sample of MAS was mixed vigorously with 5.0 g. of distilled water, a 2.0-ml. aliquot of chlorpropham (CB, s) herbicide (0.51 g./10 ml. acetone), and a 0.2-ml. aliquot of DAS. Soybean seeds (Amsoy and Hawkeye varieties) were dip coated in the slurry and air dried for 24 hr. at room temperature. Four coated seeds and four uncoated seeds (control) of each variety were placed in covered petri dishes containing No. 54 Whatman paper and 5.0 g. of distilled water. The germination results are set forth in Table VII below.

Table VII

| Sample | Germination observations | |
|---|---|---|
| | 2 da. | 3 da. |
| A. Amsoy control | 3 sprouts | 3 sprouts |
| B. Amsoy coated | 3 sprouts | 3 sprouts |
| C. Hawkeye control | 2 sprouts | 2 sprouts |
| D. Hawkeye coated | 0 sprouts | 1 sprout, 2 tips |

EXAMPLE 32

The test of Example 31 was repeated except that the seeds were planted in 12-oz. styrofoam cups containing 100 g. of potting soil and 3.0 g. of distilled water. The cups were covered tightly with "Saran" wrap. The results appear below in Table VIII.

Table VIII

| Sample | Germination observations | | |
|---|---|---|---|
| | 5 da. | 7 da. | 9 da. |
| A. Amsoy control | 4 sprouts | 4 sprouts | 4 sprouts |
| B. Amsoy coated | 4 sprouts | 4 sprouts | 2 sprouts |
| C. Hawkeye control | 0 sprouts | 2 sprouts | 2 sprouts |
| D. Hawkeye coated | 0 sprouts | 2 sprouts | 2 sprouts |

EXAMPLE 33

A 20.0-g. (w.b.) sample of MAS was mixed vigorously with 0.10 g. carbofuran (CB, s), 20.0 g. of distilled water, and a 0.8-ml. aliquot of DAS. Corn seeds of the OH-43 variety and the B-37XH84 variety were dip coated in the slurry and air dried for 24 hr. at room temperature. Four coated seeds and four uncoated seeds (control) of each variety were planted in 12-oz. styrofoam cups containing 100 g. potting soil and 3.0 g. distilled water. The cups were covered tightly with "Saran" wrap. The results appear in Table IX below.

TABLE IX

| Sample | Germination observations | | |
|---|---|---|---|
| | 5 da. | 7 da. | 9 da. |
| A. OH-43 control | 1 sprout | 4 sprouts | 4 sprouts |
| B. OH-43 coated | 2 sprouts | 2 sprouts | 3 sprouts |
| C. B-37XH84 control | 2 sprouts | 3 sprouts | 3 sprouts |
| D. B-37XH84 coated | 3 sprouts | 3 sprouts | 3 sprouts |

EXAMPLE 34

A mixture similar to that of Example 31 was prepared except 0.10 g. of malathion (OP, l), an insecticide, was substituted for the chlorpropham. Yellow corn seeds (ED-96XL66FD) were dip coated in the mixture and air dried at room temperature. Four coated seeds with the insecticide, four coated seeds without the insecticide, and four uncoated seeds (control) were planted in 12-oz. styrofoam cups containing 100 g. of potting soil. The results appear in Table X below.

Table X

| Sample | Germination observations | |
|---|---|---|
| | 9 da. | 11 da. |
| A. Control | 4 sprouts | |
| B. Coating without malathion | | 4 sprouts |
| C. Coating with malathion | | 4 sprouts |

Examples 35–39 pertain to the preparation of granular products by coating or extruding with the MAS composition of the instant invention.

EXAMPLE 35

A 100.0-g. (w.b.) sample of MAS (1.8% solids) was thoroughly mixed with 100.0 g. distilled water and a 4.0-ml. aliquot of DAS. The mixture was poured over 1.0 lb. granular "Lorsban" (15.0% AI), a commercial granular insecticide comprising chlorpyrifos (OP, s) and attaclay. The product was spread in a tray to air dry at room temperature and retained its granular mesh size.

EXAMPLE 36

The following ingredients were mixed together:
4.0 g. (w.b.) digested sludge (50% solids)
2.0 g. (w.b.) MAS (1.3% solids)
2.0 g. carbofuran insecticide ("Furadan"-powder)
0.2 g. sodium pentachlorophenate bactericide ("Dowicide-G")
0.2 g. sodium stearate (technical).

The mixture was then loaded into a stainless steel extruder having a 16-hole die ⅛ inch thick with 5/64 inch holes. One-eighth inch length rods were cut from the spaghetti-like extrudate.

EXAMPLE 37

The procedure of Example 36 was repeated except dichlobenil was substituted for the carbofuran. One-eighth inch rods were obtained.

EXAMPLE 38

The following ingredients were mixed in the order listed:
5.0 g. (w.b.) digested sludge (50% solids)
2.0 g. (w.b.) MAS (1.3% solids)
2.0 g. fenac (AR, s) herbicide
1.0 g. sodium pentachlorophenate bactericide ("Dowicide-G")
1.0 g. sodium stearate.

The mixture was extruded into pellets as in Example 34. The pelleted composition contained 31% (d.b.) fenac and 15% (d.b.) bactericide. 40 mg. of pellets were placed in a stoppered vial containing 1.0 ml. distilled water. They were intact after 75 da. of static test.

EXAMPLE 39

The procedure of Example 38 was repeated except chlorpropham (CB, s) was substituted for the fenac, 0.2 g. bactericide, and 0.4 g. sodium stearate were used.

Examples 40–42 are directed to the treatment of submersible aquatic weeds with MAS pellets.

EXAMPLE 40

The procedure of Example 36 was repeated substituting dichlobenil (NT, s) herbicide for the carbofuran. The pellets containing 24.0% AI were dropped into jars containing 15 propagules of *Hydrilla verticillata* in water. (The tests were performed in triplicate.) The results are set forth in Table XI below.

EXAMPLE 41

Pellets comprising 31% (d.b.) fenac and 15% (d.b.) bactericide were prepared by the procedure of Example 38. The pellets were dropped into jars containing 15 propagules of Hydrilla in water. (The tests were performed in triplicate.) The results are set forth in Table XII below.

EXAMPLE 42

Example 41 was repeated with the submersible aquatic plant *Myriophyllum spicatum* (Eurasian watermilfoil). The plants were placed in 3,430 ml. of water and treated with the pellets. (The tests were performed in triplicate.) The results are set forth in Table XIII below.

Table XI

| Concentration, p.p.m.[1] | Sample | Activity |||||||||
|---|---|---|---|---|---|---|---|---|---|---|
| | | 2 da. || 5 da. || 7 da. || 14 da || 21 da. ||
| | | G[2] | E[3] | G | E | G | E | G | E | G | E |
| Control (no pellets added) | 1 | 0 | 0 | 12 | 0 | 13 | 0 | 15 | 0 | 15 | 0 |
| | 2 | 1 | 0 | 13 | 0 | 15 | 0 | 15 | 0 | 15 | 0 |
| | 3 | 1 | 0 | 10 | 0 | 12 | 0 | 2 | 0 | 15 | 0 |
| 0.1 | 4 | 1 | 0 | 12 | 0 | 13 | 0 | 13 | 60 | 13 | 60 |
| | 5 | 0 | 0 | 6 | 0 | 13 | 0 | 14 | 85 | 14 | 96 |
| | 6 | 0 | 0 | 9 | 0 | 11 | 0 | 12 | 88 | 12 | 95 |
| 0.25 | 7 | 0 | 0 | 9 | 0 | 11 | 0 | 14 | 95 | 14 | 95 |
| | 8 | 1 | 0 | 7 | 0 | 10 | 0 | 12 | 96 | 12 | 97 |
| | 9 | 0 | 0 | 12 | 0 | 14 | 0 | 15 | 96 | 15 | 97 |
| 0.50 | 10 | 0 | 0 | 12 | 0 | 12 | 0 | 15 | 97 | 15 | 97 |
| | 11 | 0 | 0 | 13 | 0 | 15 | 0 | 15 | 98 | 15 | 97 |
| | 12 | 2 | 0 | 7 | 0 | 9 | 0 | 15 | 98 | 15 | 98 |

[1]p.p.m. refers to parts per million of active ingredient by weight of water.
[2]G refers to number of propagules that germinated.
[3]E refers to the phytoxic response of the germinated propagule to the chemical. 0 = no effect; 100 = complete destruction.

Table XII

| Concentration, p.p.m.[1] | Sample | Activity |||||||||
|---|---|---|---|---|---|---|---|---|---|---|
| | | 2 da. || 5 da. || 23 7 da. || 14 da || 21 da. ||
| | | G[2] | E[3] | G | E | G | E | G | E | G | E |
| Control (no pellets added) | 1 | 0 | 0 | 12 | 0 | 13 | 0 | 15 | 0 | 15 | 0 |
| | 2 | 1 | 0 | 13 | 0 | 15 | 0 | 15 | 0 | 15 | 0 |
| | 3 | 1 | 0 | 10 | 0 | 12 | 0 | 12 | 0 | 15 | 0 |
| 0.1 | 4 | 1 | 0 | 13 | 0 | 14 | 0 | 14 | 75 | 14 | 75 |
| | 5 | 1 | 0 | 12 | 0 | 12 | 0 | 14 | 55 | 14 | 50 |
| | 6 | 1 | 0 | 13 | 0 | 15 | 0 | 15 | 55 | 15 | 55 |
| 0.25 | 7 | 1 | 0 | 15 | 0 | 15 | 0 | 15 | 88 | 15 | 95 |
| | 8 | 1 | 0 | 11 | 0 | 13 | 0 | 13 | 87 | 13 | 93 |
| | 9 | 0 | 0 | 9 | 0 | 14 | 0 | 15 | 96 | 15 | 97 |
| 0.50 | 10 | 2 | 0 | 15 | 0 | 15 | 0 | 15 | 88 | 15 | 95 |
| | 11 | 1 | 0 | 11 | 0 | 13 | 0 | 13 | 87 | 13 | 93 |
| | 12 | 0 | 0 | 9 | 0 | 14 | 0 | 15 | 96 | 15 | 97 |

[1]p.p.m. refers to parts per million of active ingredient by weight of water.
[2]G refers to number of propagules that germinated.
[3]E refers to the phytoxic response of the germinated propagule to the chemical. 0 = no effect; 100 = complete destruction.

Table XIII

| Concentration, p.p.m.[1] | Sample | 2 wk. | 4 wk. | 6 wk. |
|---|---|---|---|---|
| Control | 1 | 0 | 1 | 1 |
| | 2 | 0 | 1 | 1 |
| | 3 | 0 | 1 | 1 |
| 0.32 | 4 | 7 | 35 | 45 |
| | 5 | 5 | 15 | 25 |
| | 6 | 5 | 40 | 55 |
| 0.65 | 7 | 70 | 75 | 80 |
| | 8 | 75 | 95 | 100 |
| | 9 | 60 | 99 | 100 |
| 1.28 | 10 | 96 | 95 | 100 |
| | 11 | 97 | 100 | 100 |
| | 12 | 97 | 100 | 100 |
| 2.55 | 13 | 98 | 95 | 100 |
| | 14 | 98 | 100 | 100 |
| | 15 | 96 | 100 | 100 |

NOTE: 0 = no effect; 100 = complete destruction.
[1]Parts per million of active ingredient by weight of water.

It is to be understood that the foregoing detailed description is given merely by way of illustration and that modification and variations may be made without departing from the spirit and scope of the invention.

I claim:

1. An agricultural composition comprising:
   a. an agricultural chemical selected from the group consisting of pesticides, fertilizers, insect attractants, and insect repellants, wherein said chemical is present in an amount ranging from about 0.001% to about 50% by weight of said composition;
   b. methanol treated activated sludge (MAS) solids in an amount of from about 0.006% to about 2.5% by weight of said composition; and
   c. a solvent.

2. The composition as defined in claim 1 and further comprising activated dialdehyde starch (DAS), wherein the solids ratio of DAS:MAS range from 1:5 to 0.4:1.

3. The composition as defined in claim 2, wherein the solids ratio of DAS:MAS is about 1:1.

4. The composition as defined in claim 1 wherein said agricultural chemical is a pesticide, said MAS solids are in the range of 0.1-2.0% by weight of said composition, and said composition is a film former.

5. The composition as defined in claim 1, wherein said agricultural chemical is a fertilizer and said composition is an extrudable matrix.

6. A process for producing an agricultural composition comprising the following steps:
   a. providing an agricultural chemical selected from the group consisting of pesticides, fertilizers, insect attractants, and insect repellants in an amount ranging from about 0.001% to about 50% by weight of said composition; and
   b. admixing said agricultural chemical with methanol treated activated sludge (MAS) having a viscosity in the approximate range of 2,000-14,000 cps. and a solids content in the range of 0.1-2.5% by weight, wherein said MAS solids are present in said composition in an amount ranging from about 0.006% to about 2.5% by weight.

7. The process as defined in claim 6 and further comprising admixing with said agricultural chemical and said MAS an amount of activated dialdehyde starch (DAS) wherein the solids ratio of DAS:MAS ranges from 1:5 to 0.4:1.

8. The process as defined in claim 7, wherein the solids ratio of DAS:MAS is about 1:1.

9. A process for applying an agricultural chemical selected from the group consisting of pesticides, fertilizers, insect attractants, and insect repellants to a substrate comprising the following steps:
   a. providing an agricultural composition comprising:

1. said agricultural chemical in an amount ranging from about 0.001% to about 50% by weight of said composition;
2. methanol treated activated sludge solids in an amount of from about 0.006% to about 2.5% by weight of said composition; and
3. a solvent; and b. applying said composition to said substrate to form a continuous film.

10. The process as defined in claim 9, wherein said substrate is plant foliage.

11. The process as defined in claim 10, wherein said application step is effected by spraying said mixture onto said plant foliage.

12. The process as defined in claim 9, wherein said substrate is soil.

13. The process as defined in claim 12, wherein said application step is effected by spraying said mixture onto said soil.

14. The process as defined in claim 13, wherein said agricultural chemical is a fertilizer.

15. The process as defined in claim 9, wherein said substrate is an inert carrier.

16. The process as defined in claim 9, wherein said substrate is seeds.

17. The process as defined in claim 16, wherein said application step is effected by spraying said mixture onto said seeds.

* * * * *